United States Patent
Heer et al.

(10) Patent No.: US 8,497,012 B2
(45) Date of Patent: Jul. 30, 2013

(54) AUTHENTICITY MARK IN THE FORM OF A LUMINESCENT SUBSTANCE

(75) Inventors: Stephan Heer, München (DE); Thomas Giering, Kirchseeon (DE); Kai Uwe Stock, Grünwald (DE)

(73) Assignee: Giesecke & Devrient GmbH, Munich (DE)

( * ) Notice: Subject to any disclaimer, the term of this patent is extended or adjusted under 35 U.S.C. 154(b) by 616 days.

(21) Appl. No.: 12/445,028

(22) PCT Filed: Oct. 9, 2007

(86) PCT No.: PCT/EP2007/008774
§ 371 (c)(1),
(2), (4) Date: Oct. 8, 2009

(87) PCT Pub. No.: WO2008/043523
PCT Pub. Date: Apr. 17, 2008

(65) Prior Publication Data
US 2010/0032935 A1    Feb. 11, 2010

(30) Foreign Application Priority Data
Oct. 10, 2006   (DE) .................... 10 2006 047 852

(51) Int. Cl.
*B42D 15/10*     (2006.01)
(52) U.S. Cl.
USPC ........ 428/195.1; 283/92; 428/211.1; 427/256

(58) Field of Classification Search
USPC ....................................... 428/195.1
See application file for complete search history.

(56) References Cited

U.S. PATENT DOCUMENTS

| 4,833,311 A * | 5/1989 | Jalon ............................. 235/491 |
| 6,383,618 B1 * | 5/2002 | Kaule et al. ................ 428/195.1 |
| 2004/0105962 A1 * | 6/2004 | Giering et al. ............. 428/195.1 |

FOREIGN PATENT DOCUMENTS

| DE | 19804021 | 8/1999 |
| EP | 1370424 | 3/2002 |
| WO | 02/070279 | 9/2002 |
| WO | 2005/036478 | 4/2005 |
| WO | 2007/003531 | 1/2007 |

OTHER PUBLICATIONS

"Temperature dependent emission cross-section and fluorescence lifetime of Cr,Yb:YAG crystals," Jun Dong and Peizhen Deng, Journal of Physics and Chemistry of Solids 64 (2003), 1163-1171.*
Search Report of German Patent and Trademark Office regarding German Patent Application No. 102006047852.5, Jun. 15, 2007.
International Search Report in PCT/EP2007/008774, Apr. 28, 2008.

* cited by examiner

*Primary Examiner* — Mark Ruthkosky
*Assistant Examiner* — Ian Rummel
(74) *Attorney, Agent, or Firm* — Bacon & Thomas, PLLC

(57) ABSTRACT

A printed document of value having at least one authenticity feature in the form of a luminescent substance on the basis of host lattices which are doped with one or a plurality of ions. Since the host lattices are doped with different ions, exchange interactions between clusters of ions that occur leads to cooperative effects.

26 Claims, 4 Drawing Sheets

AUTHENTICITY MARK IN THE FORM OF A LUMINESCENT SUBSTANCE

FIELD OF THE INVENTION

The invention relates to a printed document of value having at least one authenticity feature in the form of a luminescent substance on the basis of host lattices which are doped with one or a plurality of ions.

BACKGROUND

In the context of this invention the term "document of value" refers to bank notes, checks, share certificates, tokens, ID documents, credit cards, passports and other documents as well as labels, seals, packagings or other elements for the product protection.

Protecting documents of value against forgery by means of luminescent substances has already been known for a long time. The use of transition metals and rare earth metals as luminescent ions has already been discussed. Such ions have the advantage that they, after appropriate excitation, show one or a plurality of characteristic narrow-band luminescences which facilitate a reliable detection and the delimitation against other spectra. Combinations of transition metals and/or rare earth metals have also been already discussed. Such substances have the advantage that, in addition to the above-mentioned luminescences, so-called energy transfer processes are observed which can lead to more complicated spectra. In such energy transfer processes an ion can transfer its energy to another ion and then the spectra can consist of a plurality of narrow-band lines which are characteristic for the two ions.

But ions with characteristic properties, which are suitable for protecting documents of value, are limited in their number. Moreover, the ions of the transition metals and/or rare earth metals luminesce at one or a plurality of characteristic wavelengths which are dependent on the nature of the ion and of the host lattice and can be predicted. Energy transfer processes, too, lead to these characteristic luminescences of the involved ions.

DE 198 04 021 A1 describes a document of value with at least one authenticity feature in the form of a luminescent substance on the basis of doped host lattices.

EP 1 370 424 B1 describes a printed document of value having at least one authenticity feature in the form of a luminescent substance on the basis of host lattices which are doped with ions of the $(3d)^2$ electron configuration.

SUMMARY

Starting out from this prior art the invention is based on the object to increase the number and complexity of substances which are suitable as authenticity marking for documents of value and to provide in particular documents of value having authenticity features in the form of luminescent substances which differ from documents of value with hitherto known substances by a characteristic and new luminescence spectrum and other spectroscopic properties.

The invention is based on the finding that certain types of ions which are doped in suitable host lattices undergo an exchange interaction with ions of the same kind or with other ions of the host lattice. Exchange interactions lead to cooperative effects. Cooperative effects are based on the properties of the exchange-coupled system, i.e. a binuclear or multi-nuclear cluster of ions.

Exchange interactions have their origin in the electrostatic forces to which the unpaired electrons of neighboring magnetic ions are exposed. Magnetic ions means ions with unpaired electrons. Exchange interactions lead to measurable splittings of the electronic states.

Exchange interactions, generally, can be found in clusters of $d^n$ metals (transition metals), $f^n$ metals (rare earth metals) or combinations of these. However the intensity of the exchange interaction is very different. In $d^n$ metal clusters the exchange interactions are the strongest and energetic splittings of the cluster states can amount to up to some hundred wave numbers. With the $f^n$ metal clusters the exchange interactions are very much lower and the splittings of cluster states typically are smaller than one wave number.

Particularly suitable are exchange-coupled systems of $d^n$ metal clusters or $d^n$-$f^n$ metal clusters. In such systems exchange interactions can be such great that they lead to well measurable cooperative effects. The advantage of such substances is that these cooperative effects distinctly differ from the properties of the ions which do not undergo such exchange interaction.

In this context two of the cooperative effects are especially suitable, these are cooperative effects which manifest themselves in the luminescence behaviour. But this does not exclude the use of other cooperative optical and/or magnetic effects of exchange-coupled clusters.

In a first advantageous embodiment of the invention a suitable host lattice is doped with ions in such a way that exchange-coupled ion clusters of these doped ions are formed, the luminescence spectrum of which can only be understood when the exchange-coupled cluster is regarded as a luminescent whole. The luminescence spectrum of the exchange-coupled clusters distinctly differs from the luminescence spectra of individual-ions of the doped ions. Ions of the transition metals are preferred which as the lowest luminescence transition have a spin-forbidden transition which at the same time corresponds to an intra-configural transition. In the Tanabe-Sugano diagrams for $(3d)^n$ ions the suitable electron configurations $(3d)^2$, $(3d)^3$ and $(3d)^6$ can be found. The ions $Ti^{2+}$, $V^{2+}$, $V^{3+}$, $Cr^{3+}$, $Cr^{4+}$, $Mn^{4+}$, $Mn^{5+}$ and $Ni^{2+}$ are preferred. The isoelectronic ions of the $(4d)^n$ and $(5d)^n$ electron configurations are also taken into consideration. As host lattices are suitable pure or mixed compounds with at least one representative from the group of metals of the main groups I, II, transition metals and/or rare earths and at least one representative of the group of non-metals consisting of the main groups III to VII of the periodic system. Especially preferred are host lattices which lead to strong exchange interactions in the clusters.

In a second advantageous embodiment of the invention a suitable host lattice is doped with ions, so that exchange-coupled clusters are formed of the doped ions and the magnetic ions of the host lattice. As already mentioned above, magnetic ions are to have unpaired electrons. The luminescence spectrum of such a substance can only be understood, when the exchange-coupled cluster is regarded as a luminescent whole. The cluster spectrum, in contrast to the luminescence spectra of the doped ions or of the magnetic ions of the host lattice, is completely different. As host lattices are suitable pure or mixed compounds with at least one representative of the rare earths (Ce to Yb) and at least one representative of the group of non-metals consisting of the main groups III to VII of the periodic system. Additionally, the same representatives and at least one additional representative from the group of the metals of the main groups I, II, and/or the transition metals are suitable. Preferred host lattices contain the rare earth metal ions $Ce^{3+}$, $Pr^{3+}$, $Sm^{3+}$, $Eu^{3+}$, $Gd^{3+}$ and $Tb^{3+}$.

Especially preferred are those which lead to a strong exchange interaction in the clusters with the doped ions. For the doping, ions of the transition metals are preferred which as the lowest luminescence transition have a spin-forbidden transition which at the same time corresponds to an intra-configural transition. In the Tanabe-Sugano diagrams for $(3d)^n$ ions the suitable electron configurations $(3d)^2$, $(3d)^3$ and $(3d)^6$ can be found. Especially preferred are the ions $Ti^{2+}$, $V^{2+}$, $V^{3+}$, $Cr^{3+}$, $Cr^{4+}$, $Mn^{4+}$, $Mn^{5+}$ and $Ni^{2+}$. The isoelectronic ions of the $(4d)^n$ and $(5d)^n$ electron configurations are also suitable.

-BRIEF DESCRIPTION OF THE DRAWINGS

Further embodiments and advantages of the invention are explained in the following with reference to the Figures, their descriptions and the examples.

DETAILED DESCRIPTION OF VARIOUS EMBODIMENTS OF THE DISCLOSURE

For illustrating the advantages according to the invention of the first advantageous embodiment, as an example of such a substance a $Cr^{3+}$ doped oxidic host material is used. The representations in the FIGS. 1 and 2 serve to illustrate this. $Cr^{3+}$ has the $(3d)^3$ electron configuration and in octahedral oxidic coordination the ground state is referred to with the symmetry term symbol $^4A_2$. In such a host lattice the first excited state in general is the $^2E$ state. After higher-energetic excitation such a material with low $Cr^{3+}$ concentration luminesces at a not too high temperature typically in the red spectral range. Here the observed luminescence transition is a spin-forbidden transition, because the total spin S changes by one unit ($\Delta S=1$). This leads to a very narrow-band luminescence with a long lifetime, typically in the range of 10 ms.

Figure 1:
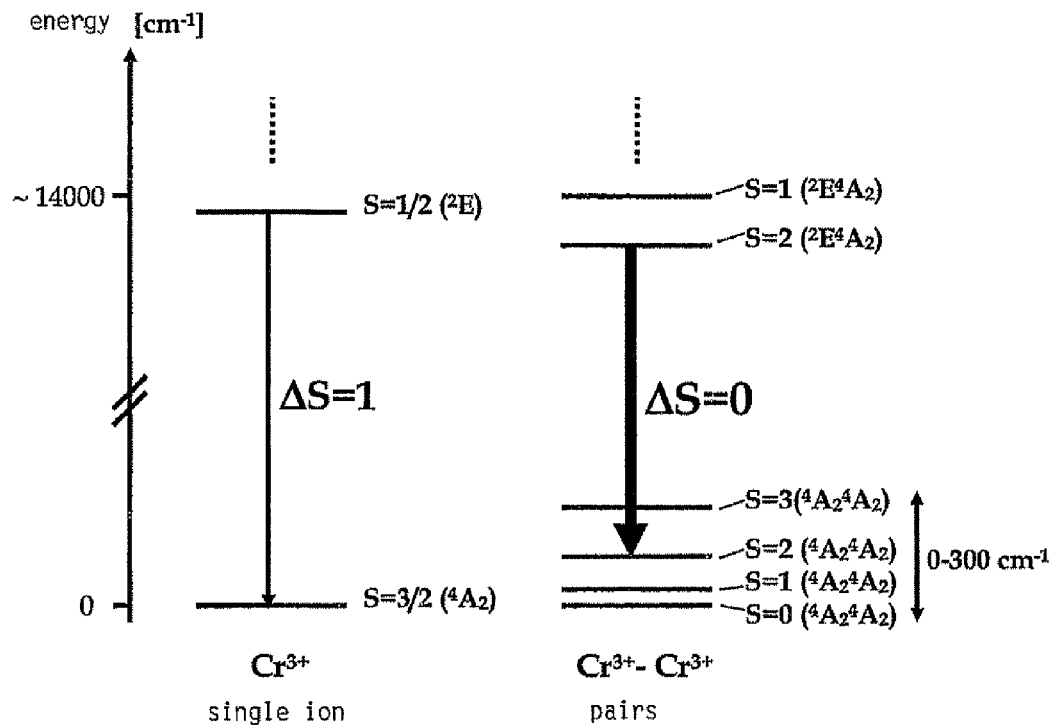
FIG. 1 shows energy level diagrams and luminescence transitions of a substance according to a first embodiment compared to a conventional luminescent substance on the basis of a $Cr^{3+}$ doped host lattice.
Figure 2:
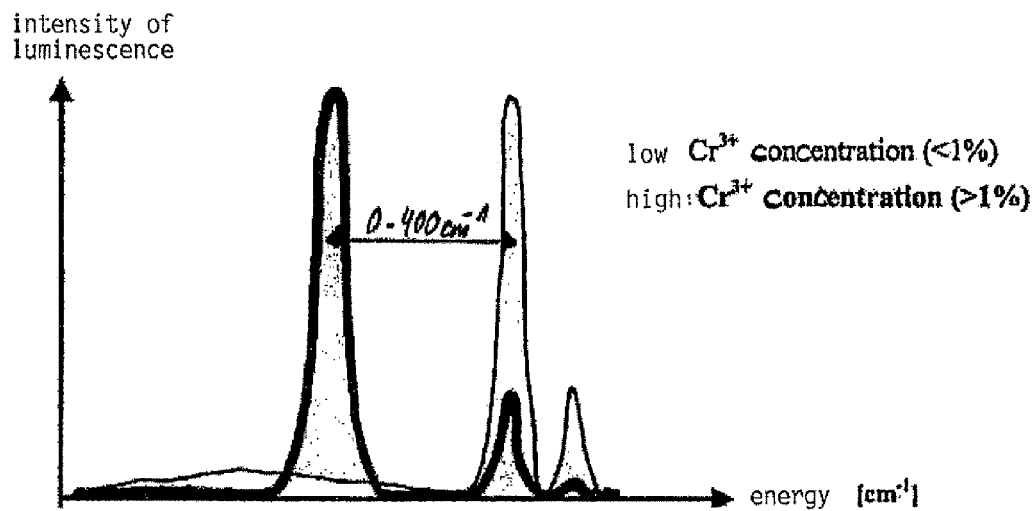
FIG. 2 shows luminescence spectra of the substance according to the first embodiment compared to a conventional luminescent substance on the basis of a $Cr^{3+}$ doped host lattice.

When the chromium concentration in the same host material is increased, one observes a new, very narrow-band luminescence line with a lifetime which is much smaller, typically 10 to 100 times smaller. This luminescence comes from exchange-coupled $Cr^{3+}$—$Cr^{3+}$ pairs. The intensity of this additional line depends on the $Cr^{3+}$ concentration in the material and on the intensity of the exchange interaction, which in turn is dependent on the choice of the host lattice. The energetic position of the line can be shifted by several hundred wave numbers (see FIG. 2). The reason for this is that the exchange interaction leads to the splitting of the ground state and the first excited state into a plurality of states, which are described the best by their total spin S, as schematically shown in FIG. 1. This transition is a spin-allowed transition with $\Delta S=0$. Such spin-allowed transitions, typically, are 100 times stronger than spin-forbidden transitions, which can also be observed with the shortened lifetime. The other possible luminescence transitions in the cluster are also spin-forbidden and are not observed in the spectrum, which is due to their enormous weakness in relation to the spin-allowed transition. The main advantage of these luminescent substances against other known luminescent substances lies in the strongly shortened lifetime of the luminescence at an unchanged similarity with respect to the spectral position and with respect to the form of the luminescence band. A further advantage is the possibility to shift the spectral position of the luminescence band.

Figure 3:
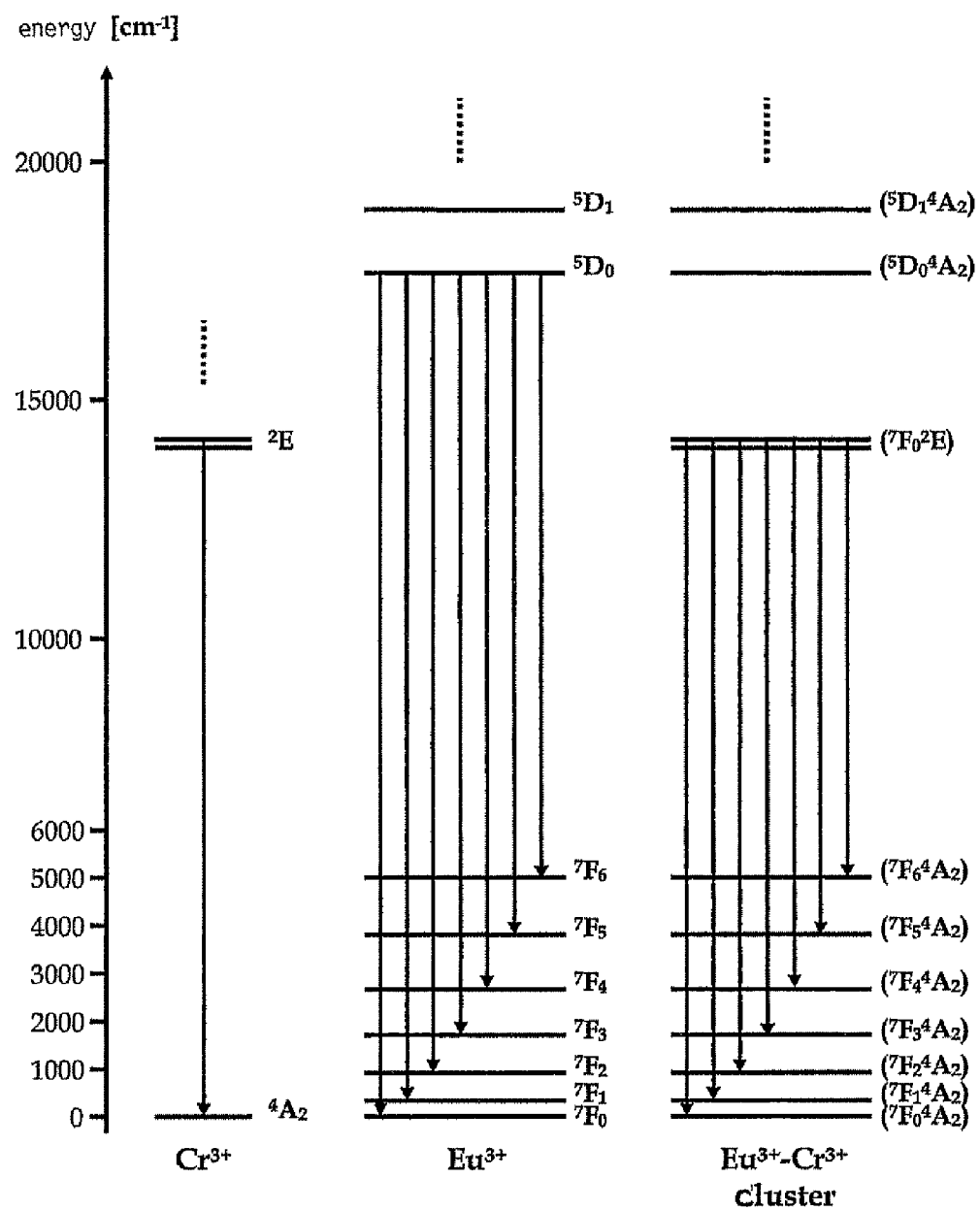
FIG. 3 shows energy level diagrams and luminescence transitions of a substance of a second embodiment compared to the conventional luminescent substances on the basis of a $Cr^{3+}$ doped oxidic europium host lattice.
Figure 4:
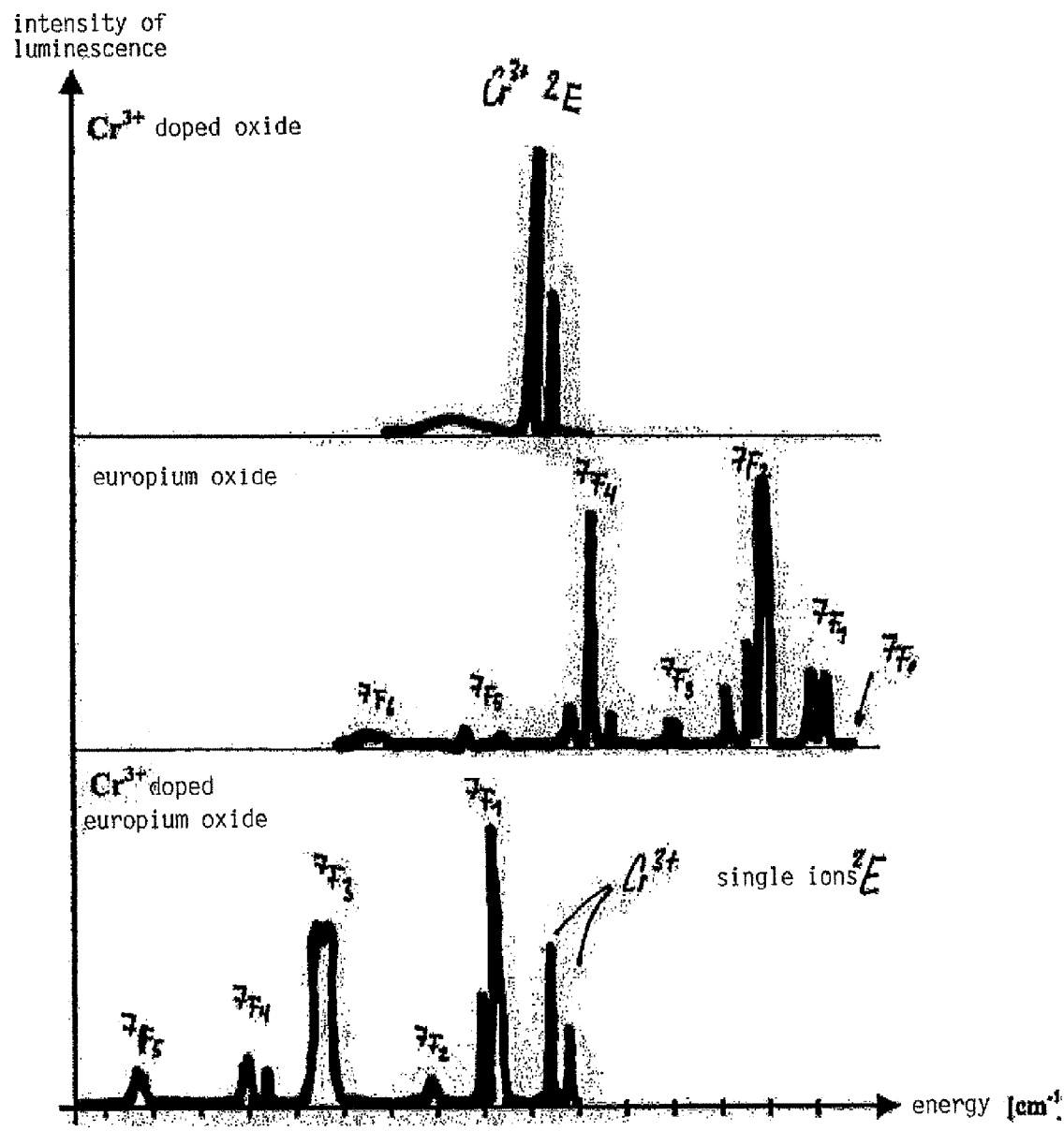
FIG. 4 shows luminescence spectra of the substance according to the second embodiment compared to the luminescences of the two conventional luminescent substances on the basis of a $Cr^{3+}$ doped oxidic europium host lattice.

For illustrating the advantages according to the invention of the second advantageous embodiment, as an example of such a substance a $Cr^{3+}$ doped oxidic europium host material is used. The representations in FIGS. 3 and 4 serve to illustrate this. $Cr^{3+}$ has the $(3d)^3$ electron configuration and in octahedral oxidic coordination the ground state is referred to with the symmetry term symbol $^4A_2$. In such a host lattice the first excited state in general is the $^2E$ state. After higher-energetic excitation such a material typically luminesces in the red spectral range. Observed are two narrow-band luminescence lines with a weak photon side band. After higher-energetic excitation an oxidic europium host lattice shows a typical $Eu^{3+}$ luminescence spectrum. The transitions correspond to the so-called f-f transitions of the $Eu^{3+}$, which are referred to with the term symbols $^{2S+1}L_J$, S referring to the total spin, L to the total orbital angular momentum and J to the total angular momentum of the states. There are observed narrow-band luminescence transitions of the $^5D_0$->$^7F_J$ type in the spectral range of yellow to red.

If an oxidic europium host lattice is doped with $Cr^{3+}$ ions, after the excitation of the $Cr^{3+}$ ion one will observe a new and characteristic luminescence, which can only be understood when exchange-coupled $Eu^{3+}$—$Cr^{3+}$ clusters are taken into consideration. The new luminescence transitions correspond to transitions from the $(^7F_0{}^2E)$ state into the $(^7F_J{}^4A_2)$ ground state levels in the $Eu^{3+}$—$Cr^{3+}$ cluster. In the $Eu^{3+}$—$Cr^{3+}$ cluster the transitions are referred to with a double term name, for example $(^7F_0{}^4A_2)$ for the ground state of the cluster. The main advantage of these luminescent substances against other known luminescent substances lies in the completely new luminescence spectrum at an unchanged narrow band of the luminescence transitions.

By varying and combining the previously mentioned substances numerous possibilities are opened for influencing the luminescence spectra of the luminescent substances according to the invention and thus to produce a multiplicity of security features. The appearing cooperative effects show a pronounced temperature dependence of the luminescences. This is a further advantage, which permits, with a suitable choice of the substance, a switching on and switching off of these effects as a function of the temperature at which the luminescences are measured. I.e. that there is the possibility of an automated test at room temperature or a selective test at a well-defined temperature.

Besides the evaluation of the luminescence spectra, likewise, the lifetime of luminescence can be used for differentiating. When evaluating besides the energy of the luminescence lines also their number and/or shape and/or their intensities can be taken into account, with which any coding can be represented.

Likewise, it is possible to incorporate further luminescent centers in the host lattice via the doping of additional ions, such as transition metal ions or rare earth metal ions, and thus to achieve a combined luminescence of the two systems or an energy transfer between the systems.

When the document of value is marked with a plurality of the luminescent substances according to the invention instead of with one luminescent substance, the number of distinguishable combinations can be further increased.

Here the marking can be effected either at different places of the document of value or at the same place. When the mark is applied or incorporated at different places of the document of value, a spatial code, e.g. in the simplest case a bar code, can be produced.

Furthermore, the forgery-proofness of the document of value can be increased, when the specifically chosen luminescent substance for example in a document of value is associated with other pieces of information of the document of value, so that a test by means of a suitable algorithm is possible. Such pieces of information can relate to the document of value, e.g. a serial number, the spatial position of certain components of the document of value etc.

It is obvious that the document of value besides the luminescent substance according to the invention can have still further additional authenticity features, which are based e.g. on classical luminescence and/or magnetism.

The luminescent substances according to the invention can be incorporated according to the invention in most different ways in the document of value. For example, the luminescent substances can be incorporated in a printing ink. But admixing the luminescent substances to the paper pulp or plastic mass when producing a document of value on the basis of paper or plastic is also possible. Likewise, the luminescent substances can be provided on or in a plastic carrier material, which for example in turn can be worked at least partially into the paper pulp. Here the carrier material which is based on a suitable polymer, such as for example PMMA, and in which the luminescent substance according to the invention is embedded can have the form of a security thread, a mottling fiber or a planchet. Likewise, for the purpose of product protection the luminescent substance can be incorporated for example directly in the material of the object to be protected, e.g. in housings and plastic bottles.

But the plastic carrier material and/or paper carrier material can also be attached to any other object, for example for the purpose of product protection. In this case the carrier material preferably has the form of a label. When the carrier material forms a component of the product to be protected, as it is the case for example with tear threads, obviously, any other design is possible. In certain cases of application it can be expedient to provide the luminescent substance as an invisible mixture as a coating on the document of value. It can be there all over or in the form of certain patterns, such as for example stripes, lines, circles or in the form of alphanumeric characters. So as to ensure the invisibility of the luminescent substance, according to the invention either a colorless luminescent substance in the printing ink or the coating lacquer must be used or a colored luminescent substance in such a low concentration that the transparency of the coating is only just given. Alternatively or additionally, the carrier material or the printing ink containing the luminescent substance can be dyed in a suitable fashion, so that the luminescent substance cannot be perceived because of its color.

Usually, the luminescent substances according to the invention are processed in the form of pigments. For a better processing or for increasing their stability the pigments can be present in particular as individually encapsulated pigment particles or be covered with an inorganic material or organic coating. For this purpose, for example, the individual pigment particles of the luminescent substance are enclosed with a silicate envelope and thus can be easier dispersed in media. Likewise, different pigment particles of a combination can be jointly encapsulated, for example in fibers, threads, silicate envelopes. Thus, for example, it is no longer possible to change the "code" of the combination. "Encapsulating" here means a complete enveloping of the pigment particles, while "coating" also means the partial enveloping or coating of the pigment particles.

In the following, some examples for the synthesis of the oxidic materials according to the invention are listed:

EXAMPLE 1

Producing Chromium-Activated Yttrium Garnet (Cr—Cr: $Y_3Al_5O_{12}$)

42.11 g aluminum oxide ($Al_2O_3$), 1.02 g chromium oxide ($Cr_2O_3$), 56.87 g yttrium oxide ($Y_2O_3$) are weighed and together with 100 g dehydrated sodium sulphate ($Na_2SO_4$) homogeneously mixed. The mixture is filled in corundum crucibles and is heated at a temperature of 1150° C. for a period of 12 hours. After cooling the resulting reaction product is comminuted to the desired particle size and in the water bath rests of the flux are cleaned off. The rests of the employed chromium oxide or by-products resulting therefrom, e.g. sodium chromate, are reduced to chromium(III) by sulphuric acid/iron sulphate and separated. The resulting product is filtered out and dried at 100° C.

EXAMPLE 2

Producing Chromium-Activated Yttrium Perovskite (Cr—Cr: $YAlO_3$)

30.32 g aluminum oxide ($Al_2O_3$), 1.02 g chromium oxide ($Cr_2O_3$), 68.66 g yttrium oxide ($Y_2O_3$) are weighed and together with 100 g dehydrated sodium sulphate ($Na_2SO_4$) homogeneously mixed. The mixture is filled in corundum crucibles and is heated at a temperature of 1150° C. for a period of 18 hours. After cooling the resulting reaction product is comminuted to the desired particle size and in the water bath rests of the flux are cleaned off. The rests of the employed chromium oxide or by-products resulting therefrom, e.g. sodium chromate, are reduced to chromium(III) by sulphuric acid/iron sulphate and separated. The resulting product is filtered out and dried at 100° C.

Figure 5:
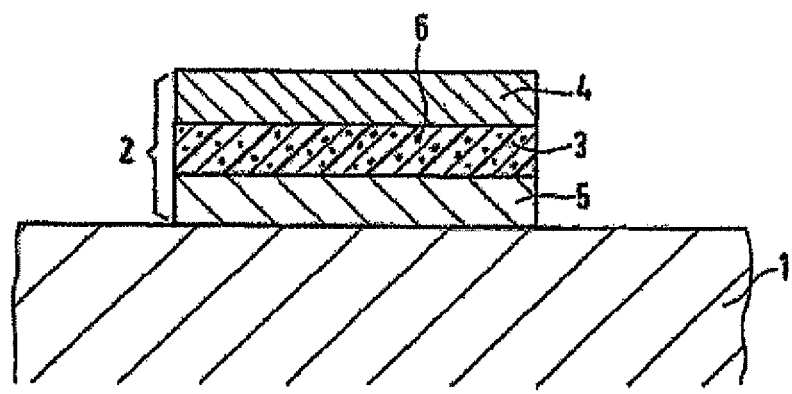
FIG. 5 shows a cross section of a security element according to the invention.

FIG. 5 shows an embodiment of the security element according to the invention. In this case the security element is made of a label 2, which is composed of a paper and/or plastic layer 3, a transparent cover layer 4, as well as an adhesive layer 5. This label 2 is connected with any desired substrate 1 via adhesive layer 5. This substrate 1 can be documents of value, ID documents, passports, deeds or the like but also other objects to be protected, such as for example CDs, packagings or the like. In this embodiment luminescent substance 6 is contained in the volume of layer 3.

Alternatively, the luminescent substance could also be contained in a not shown printing ink, which is printed onto one of the label layers, preferably onto the surfaces of layer 3.

Instead of providing the luminescent substance in or on a carrier material, which subsequently is attached as a security element to an object, according to the invention it is also possible to apply the luminescent substance directly in the document of value to be protected or onto its surface in the form of a coating.

The invention claimed is:

1. An authenticity feature for documents of value comprising a luminescent substance having host lattices doped with doping ions,
wherein the doped ions form exchange-coupled clusters with other doped ions and/or with ions of the host lattices,
wherein said exchange-coupled clusters produce cooperative effects between the doping ions and/or the host lattices to emit luminescence, and
wherein the doped ions have the electron configuration $(3d)^2$, $(3d)^3$ or $(3d)^6$ or respective electron configurations of the (4d) or (5d) transition metals.

2. The authenticity feature according to claim 1, wherein the cooperative effects result from the exchange interaction between unpaired electrons of neighboring ions.

3. The authenticity feature according to claim 1, wherein the host lattices are pure or mixed compounds selected from the group consisting of the metals of the main groups I, II, transition metals and rare earths and at least one non-metal selected from the group consisting of main groups III, IV, V, VI and VII of the periodic system of elements.

4. The authenticity feature according to claim 1, wherein the host lattices are pure or mixed compounds selected from the group consisting of the rare earths elements and at least one non-metal selected from the group consisting of the main groups III to VII of the periodic system of elements.

5. The authenticity feature according to claim 4, wherein said compounds additionally contain a compound selected from the group consisting of the metals of the main group I, II and the transition metals.

6. The authenticity feature according to claim 1, wherein the luminescent substance is present as a pigment particle.

7. A document of value comprising an authenticity feature according to claim 1, wherein the document of value comprises paper and/or plastic material.

8. The document of value according to claim 7, wherein the authenticity feature is incorporated in the volume of the document of value and/or is applied onto the document of value.

9. The document of value according to claim 7, wherein the luminescent substance is an invisible at least partial coating on the document of value.

10. The document of value according to claim 7, wherein the luminescent substance is admixed with a printing ink.

11. The document of value according to claim 7, wherein the luminescent substance is combined with at least one different authenticity feature.

12. The document of value according to claim 7, wherein at least two luminescent substances form a spectral coding in at least one spatial dimension.

13. A security element, comprising a carrier material and at least one authenticity feature according to claim 1, wherein the authenticity feature is embedded in the carrier material and/or is applied onto the carrier material.

14. The security element according to claim 13, wherein the security element is in the form of a strip or band.

15. The security element according to claim 13, wherein the carrier material is formed as a security thread, planchet or mottling fiber.

16. The security element according to claim 13, wherein the security element is formed as a label.

17. A method for producing a document of value according to claim 7, wherein the luminescent substance is added to a printing ink.

18. The method for producing a document of value according to claim 7, wherein the luminescent substance is applied by a coating process.

19. The method for producing a document of value according to claim 7, wherein the luminescent substance is worked into the volume of the document of value.

20. The method for producing a document of value according to claim 7, wherein the luminescent substance is supplied to the document of value in the form of prepared mottling fibers.

21. The method for producing a document of value according to claim 7, wherein the luminescent substance is supplied to the document of value in the form of a prepared security thread.

22. A test method for authenticity testing an authenticity feature according to claim 1, wherein at least one property of the luminescent substances is evaluated.

23. The test method for authenticity testing according to claim 22, wherein wavelengths and/or number and/or shape and/or intensity of the emission lines of the luminescent substances are evaluated.

24. The test method for authenticity testing according to claim 22, wherein the luminescence lifetimes of the luminescent substances are evaluated.

25. The test method for authenticity testing according to claim 22, wherein the evaluation is effected at different temperatures.

26. The test method for authenticity testing according to claim 22, wherein when evaluating a spatial distribution of the luminescent substance or the luminescent substances is verified.

* * * * *